United States Patent [19]

Mossi

[11] Patent Number: 5,609,356
[45] Date of Patent: Mar. 11, 1997

[54] CYLINDRICAL AIR BAG MODULE ASSEMBLY

[75] Inventor: G. Dean Mossi, Roy, Utah

[73] Assignee: Morton International, Inc., Chicago, Ill.

[21] Appl. No.: 371,337

[22] Filed: Jan. 11, 1995

[51] Int. Cl.$^6$ ................................................. B60R 21/16
[52] U.S. Cl. .................................... 280/731; 280/728.1
[58] Field of Search ................................... 280/731, 732, 280/728 R, 743 R, 740, 750, 728.1, 728.2, 743.1

[56] References Cited

U.S. PATENT DOCUMENTS

| 3,600,003 | 8/1971 | Carey ........................... 280/731 |
| 3,632,135 | 1/1972 | Chute et al. .................. 280/731 |
| 3,649,045 | 3/1972 | Smith et al. .................. 280/731 |
| 3,736,004 | 5/1973 | Haruna ......................... 280/150 |
| 3,744,817 | 7/1973 | Ousset ........................ 280/730.1 |
| 3,784,223 | 1/1974 | Hass et al. .................. 280/740 |
| 3,822,895 | 7/1974 | Ochiai ......................... 280/737 |
| 3,843,151 | 10/1974 | Lewis .......................... 280/741 |
| 3,847,411 | 11/1974 | Herrmann . |
| 3,863,948 | 2/1975 | Vancil ......................... 280/731 |
| 3,909,037 | 9/1975 | Stewart ....................... 280/738 |
| 3,968,979 | 7/1976 | Schiesterl ................... 280/731 |
| 4,111,457 | 9/1978 | Kob et al. ................... 280/728 |
| 4,275,901 | 6/1981 | Okada .......................... 280/741 |
| 4,500,114 | 2/1985 | Grey ............................ 280/731 |
| 4,913,461 | 4/1990 | Cuevas ........................ 280/731 |

FOREIGN PATENT DOCUMENTS

| 615889 | 9/1994 | European Pat. Off. ............. 280/731 |
| 0684167 | 11/1995 | European Pat. Off. . |
| 2335373 | 7/1977 | France . |
| 2115302 | 10/1972 | Germany ..................... 280/728.1 |
| 0609624 | 9/1960 | Italy ............................ 280/731 |
| 2202142 | 9/1988 | United Kingdom . |

Primary Examiner—Paul N. Dickson
Attorney, Agent, or Firm—Nick C. Kottis; Gerald K. White

[57] ABSTRACT

An air bag module assembly wherein an air bag and an inflator device are housed within a cylindrical container and the installation of such an assembly within a vehicular steering shaft.

21 Claims, 4 Drawing Sheets

CYLINDRICAL AIR BAG MODULE ASSEMBLY

BACKGROUND OF THE INVENTION

This invention relates generally to systems for the passive restraint of motor vehicle occupants and, more particularly, to module housings and assemblies used therein.

Safety restraint systems which self-actuate from an undeployed to a deployed state without the need for intervention by the operator, i.e., "passive restraint systems", and particularly those restraint systems incorporating inflatable bags or cushions, as well as the use of such systems in motor vehicles have gained general appreciation.

It is well known to protect a vehicle occupant using a cushion or bag that is inflated with gas, e.g., an "air bag", when the vehicle encounters sudden deceleration, such as in a collision. During deployment, the rapidly evolving gas with which the bag is typically filled is an inert gas, e.g., nitrogen. In such systems, the air bag is normally housed in an uninflated and folded condition to minimize space requirements. In an emergency, gas is discharged from an inflator to rapidly inflate the air bag. The air bag, upon inflation, serves to restrain the movement of the vehicle occupant as the collision proceeds. In general, such air bags are commonly designed to be inflated in no more than a few milliseconds.

Vehicular inflatable restraint systems generally include multiple crash sensors generally positioned about or mounted to the frame and/or body of the subject vehicle and serve to sense sudden decelerations by the vehicle. In turn, the sensor sends a signal to an air bag module or assembly strategically positioned within the riding compartment of the vehicle to actuate deployment of the air bag.

In general, an air bag provided for the protection of a vehicle driver, i.e., a driver side air bag, is mounted in a storage compartment located along the steering column of the vehicle. In driver side air bag installations, it is common that the air bag is housed outside the plane of the steering wheel, resulting in the hub of the steering wheel assembly being larger than otherwise needed as well as in the displacement of items such as horn switches and cruise controls that otherwise may have more easily and/or desirably been centrally located at the steering wheel hub. Further, though driver side air bags are generally circular, oval or elliptical in shape, largely as a result of the practical limitations in the folding of air bags, such driver side air bag installations are commonly covered with a rectangularly shaped cover. Thus, rather exact and complex folding of the air bag is generally required to better ensure proper deployment of the air bag from such an assembly.

While the inclusion of air bag module assemblies in motor vehicles has become relatively common, there is an ongoing desire to improve the functioning of such assemblies, a desire for the provision of arrangements which result in greater design flexibility not only for the assembly but also for placement and location of items such as horn switches and cruise controls in the surrounding vehicle interior, as well as a need to reduce the manufacture and/or material costs associated with such arrangements.

Also, as weight minimization is an especially important concern in modern vehicle design as a result of the impact the weight on vehicular fuel mileage, air bag module assemblies which facilitate incorporation within a vehicle without significantly impacting the weight and mileage capability of the resulting vehicle are desired.

SUMMARY OF THE INVENTION

A general object of the invention is to provide an improved air bag module assembly and combinations therewith.

A more specific objective of the invention is to overcome one or more of the problems described above and/or satisfy, at least in part, one or more of the needs described above.

The general object of the invention can be attained, at least in part, through a cylindrical air bag module assembly that includes a module housing, an inflator device, and an inflatable air bag. The module housing includes an elongated tubular member having an open first end and a second end. The inflator device is cylindrical and is disposed within the housing tubular member. The inflator device includes opposed first and second axial ends, with the second axial end being closed and adjacent the second end of the housing tubular member. Upon actuation, the inflator device emits inflation gas from the first axial end thereof. The inflatable collapsed air bag is also disposed within the housing tubular member. The air bag includes an opening permitting passage of inflation gas into the air bag resulting in inflation and deployment of the air bag out of the open first end of the housing tubular member.

The prior art fails to provide an air bag and air bag assembly that can be readily concealed within a steering wheel such that, prior to deployment, the location and placement of the air bag and assembly are not obvious and prominent to a passenger or other viewer of the vehicle interior. Further, prior art driver side air bag assemblies can undesirably restrict and limit the styling and design of the steering wheel as well as impact the location and placement of vehicle features such as horn switches and cruise controls.

The invention further comprehends a combination of an air bag module assembly, having an air bag for restraining and protecting a driver, and a steering wheel assembly in which the air bag module assembly is installed. The combination includes:

a) a hollow, cylindrical steering wheel shaft, b) a hollow, cylindrical module housing including an elongated tubular member having an open first end and a second end, with the module housing fitted within the steering wheel shaft, c) a cylindrical air bag inflator device disposed within the housing tubular member, the inflator device having opposed first and second axial ends, with the second axial end of the inflator device being closed and adjacent the second end of the housing tubular member and, upon actuation, the inflator device emitting inflation gas from the first axial end thereof, and d) an inflatable collapsed air bag also disposed within the housing tubular member, the air bag having an opening permitting passage of inflation gas into the air bag resulting in inflation and deployment of the air bag out of the open first end of the housing tubular member.

Other objects and advantages will be apparent to those skilled in the art from the following detailed description taken in conjunction with the appended claims and drawings.

BRIEF DESCRIPTION OF THE DRAWINGS

For ease of illustration and discussion, like parts in the drawings are designated by the same reference numeral.

DETAILED DESCRIPTION OF THE INVENTION

Figure 1:
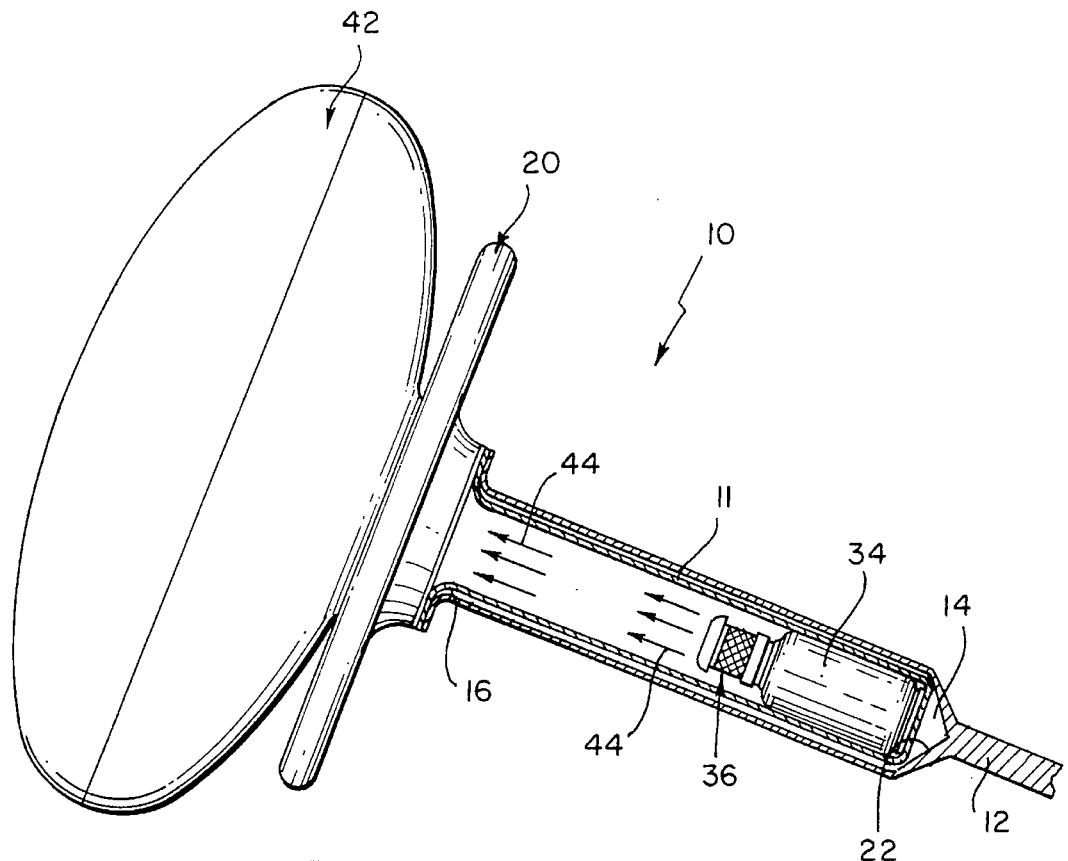
FIG. 1 is a simplified, partially in section fragmentary side view of an air bag module installation in accordance with one embodiment of the invention, with the air bag deployed.

The present invention, as is described in more detail below, provides an improved air bag module assembly and combinations therewith for use in inflatable passive restraint systems for use in vehicles for restraining the movement of a seated occupant during a collision.

Referring to the drawings and initially referring particularly to FIGS. 1–4, there is illustrated an air bag module installation, generally designated by the reference numeral 10, in accordance with one embodiment of the invention.

In the installation 10, an air bag module assembly 11 is installed in a vehicle steering shaft 12, specifically, within an elongated hollow 14 in the vehicle steering shaft 12. The steering shaft hollow 14 is formed to have an open end 16, adjacent the steering wheel 20, and a closed opposite end 22.

Figure 2:
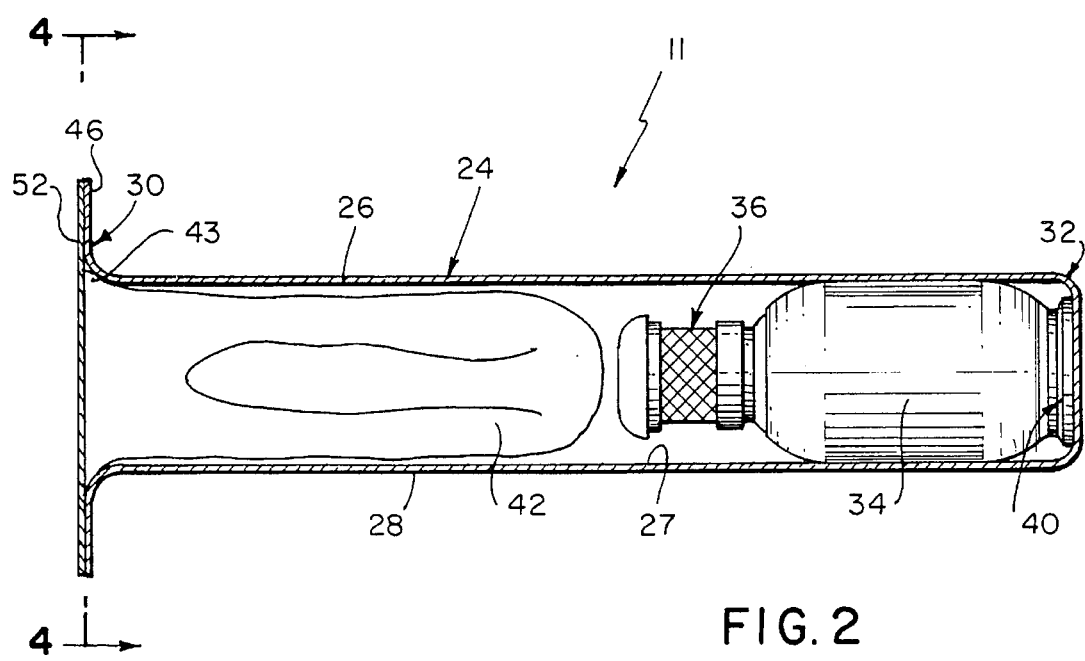
FIG. 2 is a simplified, partially in section side view of the air bag module assembly of FIG. 1 prior to deployment of the air bag.

As shown in FIG. 2, the air bag module assembly 11 is cylindrical in cross section and includes a module housing 24 formed by an elongated tubular member 26 having an inner surface 27 and an outer surface 28 and including a first end 30 and a second end 32. In this illustrated embodiment, the first end 30 is open and the second end 32 is closed.

A cylindrical air bag inflator device 34 and having opposed first and second axial ends 36 and 40, respectively, is disposed within the housing tubular member 26 with the second inflator device axial end 40 being closed and adjacent the second end 32 of the housing tubular member 26. Air bag inflator devices suitable for use include devices in which the principal source of inflation gas is:

a) stored compressed gas,
b) derived from the combustion of a gas generating material, e.g., a pyrotechnic, a flammable gas, or a liquid fuel, or
c) a combination of stored compressed gas and gas derived from the combustion of a gas generating material, e.g., a pyrotechnic, a flammable gas, or a liquid fuel. This type of inflator device utilizing a pyrotechnic gas generating material is commonly referred to as a hybrid inflator.

Also housed or disposed within the housing tubular member 26, in a collapsed condition, is an air bag 42 with an inlet opening 43.

As shown in FIG. 1, upon actuation, the inflator device 34 emits inflation gas (depicted by arrows 44) from the first inflator device axial end 36, resulting in deployment and inflation of the air bag 42.

Figure 4:
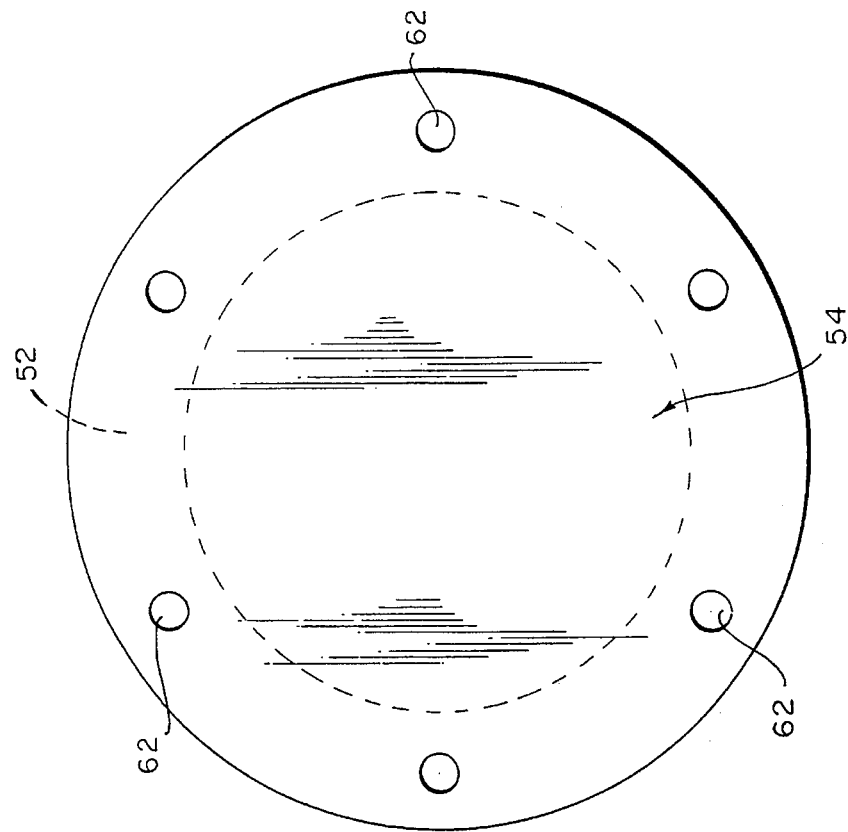
FIG. 4 is a plan view taken along line 4—4 of FIG. 2 and viewed in the direction of the arrows of the air bag module assembly.
Figure 3:
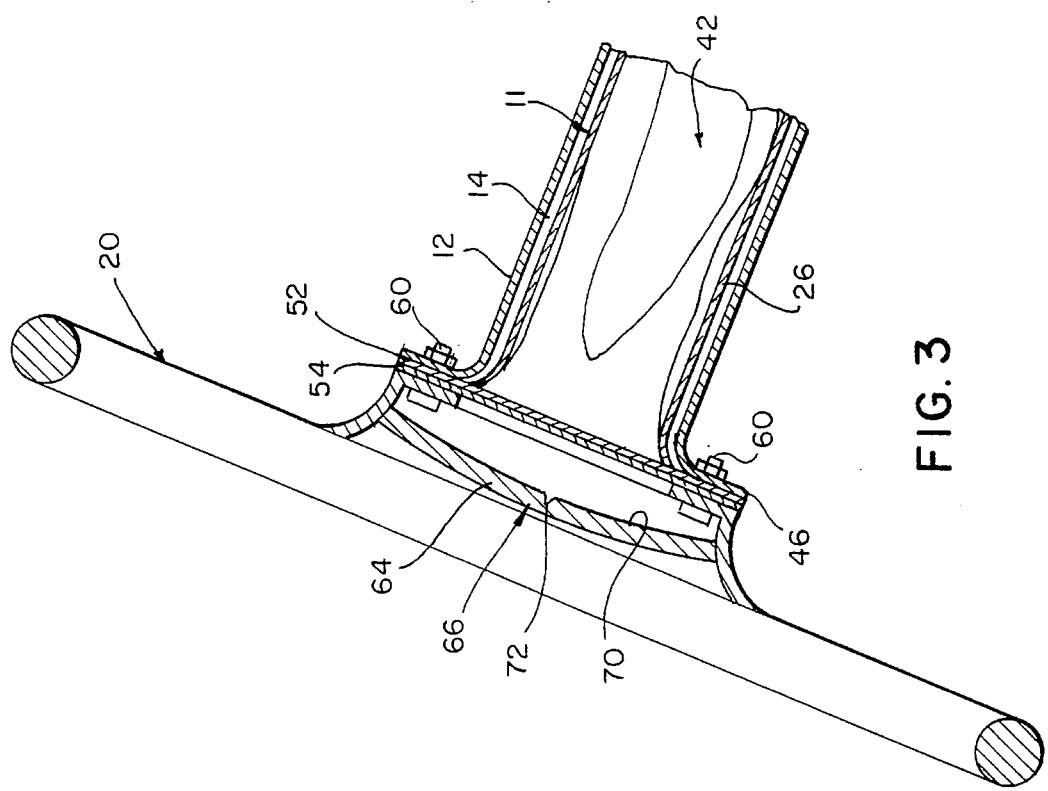
FIG. 3 is a simplified, enlarged, fragmentary, partially in section side view of the air bag module assembly installation of FIG. 1 prior to deployment of the air bag.

As shown in FIGS. 2–4, the open first end 30 of the housing tubular member 26 forms an outwardly extending mounting flange 46. Further, the air bag inlet opening 43 is retained to the housing tubular member 26 between an annular air bag retaining ring 52 and the mounting flange 46. In such an arrangement, prior to securing the module assembly therein, the air bag retaining ring 52 is temporarily held to the air bag module housing 24, specifically the mounting flange 46, by holding means such as by means of an adhesive such as an acrylic pressure sensitive adhesive such as 3M-439, by 3M. It will be appreciated by those skilled in the art, however, that other suitable holding means including crimping and mechanical holding means such as foldable or interlocking attachment tabs, for example, can be utilized to effect such a temporary hold until final securing of the module assembly within the steering wheel shaft results in a more permanent final hold or attachment.

The air bag 42 is collapsed and inverted upon itself and positioned within the housing 26. The use of such an inverted air bag in the module assembly of the invention can reduce or eliminate the need for the relatively complex and exact air bag folding required in those air bag module assemblies wherein, as described above, the air bag is stored or housed outside of the plane of the steering wheel.

If desired, and as shown, a protective covering 54 such as of reinforced paper or rupturable plastic can be placed in covering relation to the open end 30 of the housing 26, adjacent the air bag retaining ring 52 and opposite the mounting flange 46. For example, the protective covering 54 can be joined to the air bag retaining ring by means of a suitable adhesive, such as an acrylic pressure sensitive adhesive such as 3M-439, by 3M, or other suitable method of joinder. The protective covering 54 provides a seal between the internal components of the assembly 11 and the outer surrounding environment and thus serves as a barrier to the undesired entry of objects into the module assembly as well as helping to ensure that the air bag is properly retained and maintained in an inverted state during assembly handling and installation.

In such an installation 10, the assembly 11 is nested completely within the vehicle steering shaft 12, where it is hidden. Such installation and attachment can be effected by means of fasteners 60 passed through the assembly 11, e.g., fastener openings 62 in the protective covering 54, the air bag retaining ring 52, the air bag 42, and the mounting flange 46. Also, as is known in the art, an outer cover 64, such as positioned at the steering wheel center 66, can be provided.

In the operation of such an installation, such as upon the sensing of a frontal collision of sufficient magnitude, the air bag system is triggered into operation with gas emanating from the inflator device 34 within the tubular housing 26. As the pressure within the housing 26 increases, the air bag 42 starts to invert and deploy. When the pressure within the housing 26 exceeds the structural capability of the protective covering 54, the covering 54 ruptures or otherwise permits deployment of the air bag 42 out of the open first end 30 of the housing member 26 and against the inner surface 70 of the outer cover 64. As a result of the force exerted against the outer cover 64 by way of the inflating air bag 42, the outer cover 64 will tear or otherwise open such as along a pre-form tear seam 72, such as is known in the art, permitting the deployment of the air bag 42 therethrough.

Figure 5:
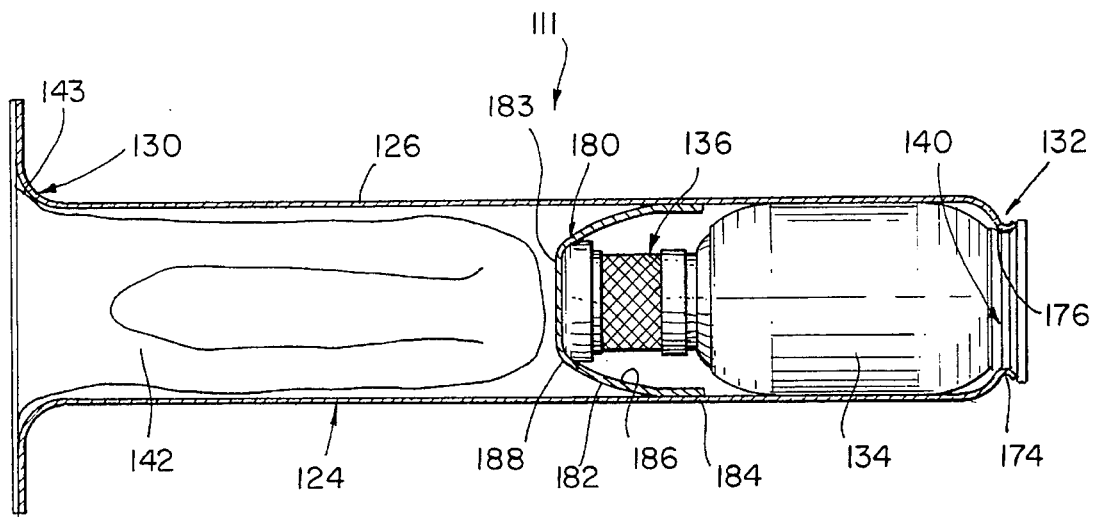
FIG. 5 is a simplified, partially in section side view, similar to FIG. 2, of an air bag module assembly in accordance with an alternative embodiment of the invention.

FIG. 5 is similar to FIG. 2 and shows an air bag module assembly 111 in accordance with an alternative embodiment of the invention. As with the air bag module assembly 11 of FIGS. 1–4, the air bag module assembly 111 includes a module housing 124 formed by an elongated tubular member 126 having a first end 130 and a second end 132. Disposed within the housing tubular member 126 is an air bag inflator device 134 having opposed first and second axial ends, 136 and 140, respectively. Also housed or disposed within the housing tubular member 126, in a collapsed condition, is an air bag 142, with an inlet opening 143.

In the embodiment of FIG. 5, however, both the first and second ends, 130 and 132, respectively, of the housing tubular member 126 are initially open, with the second end 132 being crimped to form a mechanical lock 174 about an attachment indentation 176 at the second axial end 140 of the inflator device 134. Such an arrangement not only provides for the attachment of the inflator within the housing but also forms a closure for one end of the housing tubular member, as a tube that is open ended (as shown in FIG. 5) can be less costly and difficult to form than a similarly sized and shaped closed end tube (as shown in FIG. 2).

Additionally, the embodiment of FIG. 5 includes a particulate filter 180 disposed within the housing tubular member 126 between the inflation gas emitting first axial end 136 of the inflator device 134 and the inlet opening 143 of the air bag 142. Specifically, the particulate filter 180 is in the form of a U-shaped particulate filter device 182 formed of a suitable material such as a metal wire screen material, such as a 30 mesh carbon steel. The U-shaped particulate filter device 182 includes a closed base portion 183 and an open mouth portion 184 and has inner and outer surfaces, 186 and 188, respectively.

The inclusion of such a filter device to effect particulate removal will be particularly desired in those assemblies which include inflator devices that utilize a combustible gas generating material, e.g., a pyrotechnic, which may produce significant amounts of particulate.

It also to be appreciated that such particulate filter device can also include a filter media such as of ceramic paper or steel wool housed between one or more layers of suitable metal wire screen material, such as to effect improved particulate filtration.

In the embodiment of FIG. 5, the inflation gas emitting first axial end 136 of the inflator device 134 is disposed within the open mouth portion 184 of the U-shaped particulate filter device 182 and adjacent inner surface 186 of the filter device 182 along the closed base portion 183 thereof.

It will be appreciated that the arrangement illustrated in FIG. 5 can provide various manufacturing and/or assembly advantages. For example, such an arrangement can be utilized to permit the filter device to be pre-assembled with the inflator device, e.g., the filter device can be tack welded to the inflator device, prior to installation of such pre-assembled arrangement in the module housing.

Figure 6:
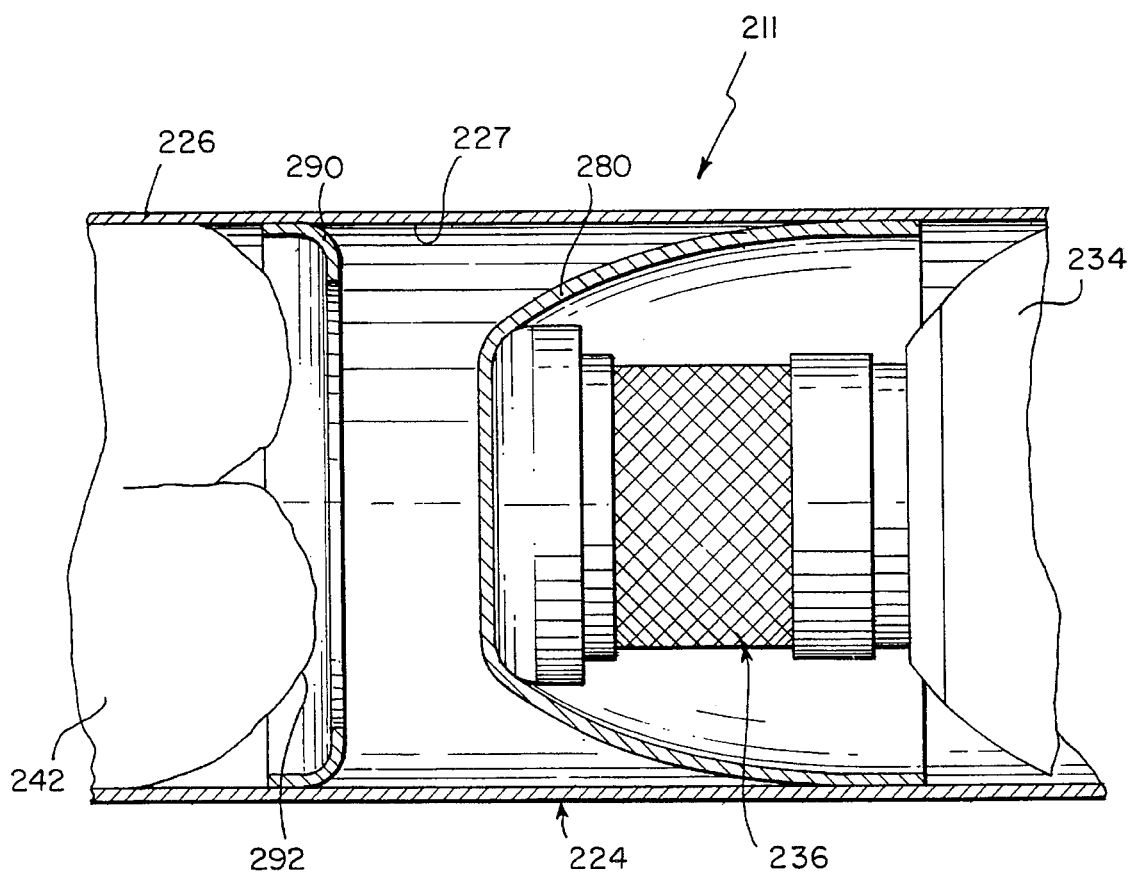
FIG. 6 is an enlarged, fragmentary, partially in section, side view of a portion of an air bag module assembly in accordance with yet another embodiment of the invention.

FIG. 6 illustrates an air bag module assembly 211 similar to the assembly 111 shown in FIG. 5 and including a module housing 224 formed by an elongated tubular member 226. Disposed within the housing tubular member 226 is an airbag inflator device 234 having a first axial end 236 wherefrom, upon actuation, inflation gas is discharged. Also housed or disposed within the housing tubular member 226, in a collapsed condition, is an air bag 242. In addition, the assembly 211 is a particulate filter 280 disposed within the housing tubular member 226 between the inflation gas emitting first axial end 236 of the inflator device 234 and the air bag 242.

The assembly 211, however, also includes an annular baffle 290 joined to the inner surface 227 of tubular housing member 226 and positioned between the inflation gas emitting first axial end 236 of the inflator device 234 and the air bag 242, specifically between the particulate filter 280 and the air bag 242. Such a baffle can be fabricated of a material such as of steel similar to that used in the fabrication of the housing member 226 and can be included in those assemblies where gas flow redirection is desired. For example, such a baffle can be included such as to effect gas flow redirection whereby the gas flow is directed towards the bottom 292 of the inverted air bag 242 rather than along the inner surface 227 of the tubular housing member 226. By directing the gas towards the bottom of the inverted air bag rather than between the inverted air bag and the module housing undesired deployment of the air bag such as to plug the open first end of the module housing tubular member is avoided. Further, it will be appreciated that, if desired, two or more baffles can be included within the housing member such as to effect further gas flow redirection.

Figure 7:
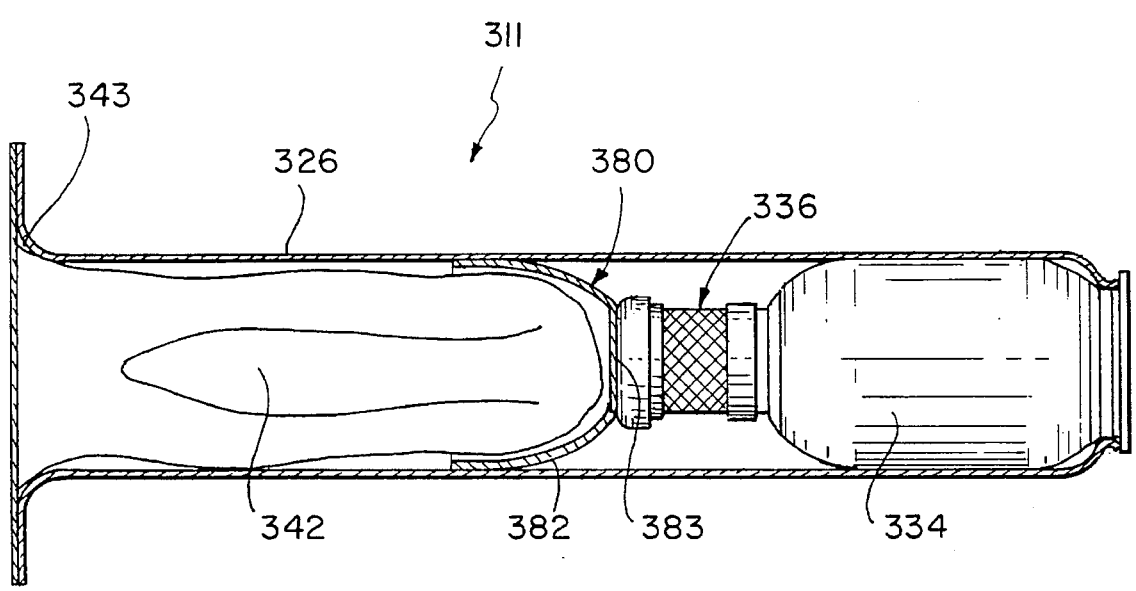
FIG. 7 is a simplified, partially in section side view, similar to FIG. 2, of an air bag module assembly in accordance with yet still another alternative embodiment of the invention.

FIG. 7 illustrates an air bag module assembly 311 in accordance with yet another embodiment of the invention. The air bag module assembly 311 is similar to the assembly 111 shown in FIG. 5, however, the particulate filter 380 disposed within the housing tubular member 326 between the inflation gas emitting first axial end 336 of the inflator device 334 and the inlet opening 343 of the air bag 342 has an inverted orientation. That is, the inflator device 334 is disposed adjacent the outer surface 388 of filter device 382 along the closed base portion 383 thereof.

It will be appreciated that the arrangement illustrated in FIG. 7 can provide various manufacturing and/or assembly advantages. For example, such an arrangement can be utilized to permit the filter device to be attached within the tubular module housing prior to insertion of the inflator as the so pre-attached filter device can then act as a stop to limit the extent to which the inflator device is inserted within the tubular module housing.

In practice, the steering shaft of a vehicle typically functions as a structural member of the vehicle and is commonly fabricated of hardened, alloy steel in order to be better able to withstand the large forces to which the steering shaft may be subjected. The housing of an inflator device and an air bag, such as a part of an air bag module assembly unit as described herein, within a vehicular steering shaft, makes for a more efficient utilization of the structural strength present in the steering shaft and thus allows for greater design freedom. For example, as the module assembly in accordance with one aspect of the invention is housed within the steering shaft, the housing of the assembly and/or the inflator device housed therein can be fabricated of lighter weight or thickness material, e.g., steel, resulting in desired cost and weight savings.

The invention thus provides an arrangement wherein an air bag and air bag assembly can be readily concealed within a steering wheel such that, prior to deployment, the location and placement of the air bag and assembly are not obvious and prominent to a passenger or other viewer of the vehicle interior. Further, the arrangement of the invention provides for greater design and styling freedom, such as may result in improved ergonomic design of the vehicle interior.

While the invention has been described hereinabove with particular reference to a driver side air bag module assembly for automotive vehicles including vans, pick-up trucks, and particularly automobiles, it is to be understood that the invention also has applicability, in at least certain aspects, for other types or kinds of airbag assemblies. For example, the cylindrical air bag module assemblies of the invention may because of considerations such as size or geometry find application in passenger side and side impact air bag assemblies.

The invention illustratively disclosed herein suitably maybe practiced in the absence of any element, part, step, component, or ingredient which is not specifically disclosed herein.

The foregoing detailed description is given for clearness of understanding only, and no unnecessary limitations are to be understood therefrom, as modifications within the scope of the invention will be obvious to those skilled in the art.

What is claimed is:

1. A cylindrical air bag module assembly comprising:
   a module housing including an elongated tubular member having an open first end and a closed second end,
   a cylindrical air bag inflator device disposed within the housing tubular member, said inflator device having opposed first and second axial ends, with the second axial end of said inflator device being closed and adjacent the second end of the housing tubular member and, upon actuation, said inflator device emitting inflation gas from the first axial end thereof, and
   an inflatable collapsed air bag also disposed within the housing tubular member, said air bag having an opening permitting passage of inflation gas into the air bag resulting in inflation and deployment of the air bag out of the open first end of the housing tubular member.

2. The air bag module assembly of claim 1 wherein said inflator device contains stored pressurized gas and a combustible gas generating material.

3. The air bag module assembly of claim 1 wherein said air bag is disposed within the housing tubular member in an inverted state.

4. The air bag module assembly of claim 1 additionally comprising particulate filter means disposed within the housing tubular member between the inflation gas emitting first axial end of said inflator device disposed adjacent thereto and the air bag opening.

5. The air bag module assembly of claim 1 additionally comprising cover means disposed about the open first end of the housing tubular member, said cover means serving as a physical barrier between items outside of the tubular housing member and those items disposed within the tubular housing member.

6. The air bag module assembly of claim 1 wherein said cylindrical air bag inflator device is also elongated, with each of said air bag inflator device and the elongated tubular housing having an axis of elongation and with the elongation axis of said air bag inflator device and the elongated tubular housing being aligned.

7. A cylindrical air bag module assembly comprising:
   a module housing including an elongated tubular member having an open first end and a second end,
   a cylindrical air bag inflator device disposed within the housing tubular member, said inflator device having opposed first and second axial ends, with the second axial end of said inflator device being closed and adjacent the second end of the housing tubular member and, upon actuation, said inflator device emitting inflation gas from the first axial end thereof, wherein the second end of the housing tubular member is open and is directly crimped about the closed second end of said inflator device, and
   an inflatable collapsed air bag also disposed within the housing tubular member, said air bag having an opening permitting passage of inflation gas into the air bag resulting in inflation and deployment of the air bag out of the open first end of the housing tubular member.

8. A cylindrical air bag module assembly comprising:
   a module housing including an elongated tubular member having an open first end and a second end,
   a cylindrical air bag inflator device disposed within the housing tubular member, said inflator device having opposed first and second axial ends, with the second axial end of said inflator device being closed and adjacent the second end of the housing tubular member and, upon actuation, said inflator device emitting inflation gas from the first axial end thereof, and
   an inflatable collapsed air bag also disposed within the housing tubular member, said air bag having an opening permitting passage of inflation gas into the air bag resulting in inflation and deployment of the air bag out of the open first end of the housing tubular member and
   additionally comprising at least one annular flow baffle secured to the inner side of the tubular housing member between the inflation gas emitting first axial end of said inflator device and the air bag opening.

9. A cylindrical air bag module assembly comprising:
   a module housing including an elongated tubular member having an open first end and a second end,
   a cylindrical air bag inflator device disposed within the housing tubular member, said inflator device having opposed first and second axial ends, with the second axial end of said inflator device being closed and adjacent the second end of the housing tubular member and, upon actuation, said inflator device emitting inflation gas from the first axial end thereof,
   an inflatable collapsed air bag also disposed within the housing tubular member, said air bag having an opening permitting passage of inflation gas into the air bag resulting in inflation and deployment of the air bag out of the open first end of the housing tubular member, and
   particulate filter means disposed within the housing tubular member between the inflation gas emitting first axial end of said inflator device and the air bag opening, said particulate filter means comprising a U-shaped particulate filter device having a closed base portion and an open mouth portion and having an inner surface and an outer surface, with the outer surface of said filter device contacting the inner surface of the elongated tubular member.

10. The air bag module assembly of claim 9 wherein the inflation gas emitting first axial end of said inflator device is disposed within the open mouth U-shaped particulate filter device and adjacent the closed base portion thereof.

11. The air bag module assembly of claim 9 wherein the inflation gas emitting first axial end of said inflator device is disposed adjacent the outer surface of the closed base portion of the U-shaped particulate filter device.

12. In combination, an air bag module assembly having an air bag for restraining and protecting a driver and a steering wheel assembly in which said air bag module assembly is installed, the combination comprising:
   a hollow, cylindrical steering wheel shaft,
   a hollow cylindrical module housing including an elongated tubular member having an open first end and a second end, with said module housing fitted within said hollow, cylindrical steering wheel shaft,
   a cylindrical air bag inflator device disposed within the housing tubular member, said inflator device having opposed first and second axial ends, with the second axial end of said inflator device being closed and adjacent the second end of the housing tubular member and, upon actuation, said inflator device emitting inflation gas from the first axial end thereof, and an inflatable collapsed air bag also disposed within the housing tubular member, said air bag having an opening permitting passage of inflation gas into the air bag resulting in inflation and deployment of the air bag out of the open first end of the housing tubular member.

13. The combination of claim 12 wherein the second end of the housing tubular member is open and is directly crimped about the closed second end of said inflator device.

14. The combination of claim 12 wherein said inflator device contains stored pressurized gas and a combustible gas generating material.

15. The combination of claim 12 wherein said air bag is disposed within the housing tubular member in an inverted state.

16. The combination of claim 12 additionally comprising particulate filter means disposed within the housing tubular member between the inflation gas emitting first axial end of said inflator device and the air bag opening.

17. The combination of claim 16 wherein said particulate filter means comprises a U-shaped particulate filter device having a closed base portion and an open mouth portion and having an inner surface and an outer surface.

18. The combination of claim 17 wherein the inflation gas emitting first axial end of said inflator device is disposed within the open mouth U-shaped particulate filter device and adjacent the inner surface of the closed base portion of the U-shaped particulate filter device.

19. The combination of claim 17 wherein the inflation gas emitting first axial end of said inflator device is disposed adjacent the outer surface of the closed base portion of the U-shaped particulate filter device.

20. The combination of claim 19 additionally comprising at least one flow baffle secured to the inner side of the tubular housing member between the inflation gas emitting first axial end of said inflator device and the air bag opening.

21. The combination of claim 12 additionally comprising cover means disposed about the open first end of the housing tubular member, said cover means serving as a physical barrier between items outside of the tubular housing member and those items disposed within the tubular housing member.

\* \* \* \* \*